UNITED STATES PATENT OFFICE.

EDUARD POHL, OF RHÖNDORF, GERMANY.

PROCESS OF PROMOTING FERMENTATION.

1,074,814. Specification of Letters Patent. Patented Oct. 7, 1913.

No Drawing. Application filed November 14, 1911. Serial No. 660,291.

*To all whom it may concern:*

Be it known that I, EDUARD POHL, engineer, subject of the King of Prussia, residing at Rhöndorf, Rhine, Germany, have invented new and useful Improvements in Processes of Promoting Fermentation, of which the following is a specification.

This invention relates to processes of promoting fermentation; and it comprises a method of promoting and controlling fermentative activity in the broad sense, by maintaining attackable zeolites containing inorganic nutrients in available form in contact with materials undergoing enzymic or fermentative changes during the progress thereof; all as more fully hereinafter described and as claimed.

Certain decompositions and changes of organic materials and substances by the action of ferments, accomplished by, or with the aid of, enzyms, are known as fermentations. It is to these actions, broadly, that the present invention applies. In the narrower sense, fermentation is used to designate the transformation of various sugars, starch, etc., into alcohol and carbonic acid by the agency of yeast. And in fermentation in this narrower sense, the present invention is particularly available, though it is useful in fermentation of tobacco (ripening), in cellulose fermentation, in the production of pressed yeast, lactic acid, acetic acid, etc. In making beer or alcohol from grain, it may be applied at any stage of the operation where enzymic or fermentative actions come into play, as in steeping, mashing, brewing, etc.

In the zymotechnical arts there are many actions taking place which have to some extent been elucidated by recent researches; but some of these actions still require explanation. We are, for instance, today aware that yeast requires both organic and inorganic nutrients and that of these latter, phosphorus, potassium and magnesium compounds are indispensable while calcium, silicon, sulfur, etc., compounds are deemed of less importance. But we are still in the dark as to the manner in which these inorganic materials affect the nutrition and increase of yeast or non-cellular fermentations (enzym actions). It is known, however, that the presence or absence of these inorganic materials, and the form in which they occur, are of the greatest importance in the stated arts. In making beer, for example, it has been proved that the mineral substances in the water used in steeping the barley have considerable influence on the character of the malt produced. It has therefore been proposed to add various chemicals to the water, as by adding calcium carbonate and magnesium carbonate to the steep water to render it similar to the water used in making Munich and Pilsen beers. Similarly, efforts have been made to improve brewing waters by the addition of gypsum. These efforts however have not been particularly successful since a simple direct addition of these inorganic nutrients has not given the desired results. They are sufficiently soluble to affect the delicate balances of neutrality and composition obtaining in the various liquids used.

I have found that in the addition of inorganic substances for the purposes of nutrition or stimulation a desirable influence on the course of fermentation, using this term in its widest sense, is obtained by employing them either as contained in appropriate zeolites or in connection with zeolites containing interchangeable constituents.

By the term "zeolite" I mean not only the natural hydrous minerals containing aluminum silicates as well as other silicates but also the artificial materials known under the collective name of "zeolites" (also called "geolites" and "permutites") and containing easily replaceable constituents, both basic constituents and acid constituents, as where silica is substituted by phosphoric acid, boric acid, etc. One material which may be used in the present invention is a potassium zeolite containing potassium oxid, lime, silica and alumina in the approximate ratio of 21:10; 42:12. A calcium zeolite which may be used contains potassium oxid, lime, silica and alumina in the approximate ratio of 3:13:32:52. These zeolites while insoluble bodies have the property of interchanging constituents with dissolved salts; a potassium zeolite, for example, in a solution of a calcium salt giving up soluble potassium compounds to the liquid and abstracting calcium compounds until a certain balance obtains between the calcium and the potassium in the zeolites and in the solution. It is this property which renders the zeolites useful in the present invention since the nutritive substance may be added in the form of an insoluble zeolite which acts as a sort of storehouse, giving up the particular component as the needs of the fermentation require it. Ordinarily the zeolite employed should be so fine-ground that when added to the water, or the liquid employed, it will remain suspended to an extent making the solution appear like an emulsion.

In making beer under the present invention, appropriate zeolites may be added to the liquid at any stage of the operation, as in steeping, in mashing, or in the fermentation proper. For example, in steeping the barley in making malt, zeolites may be added to the steep-water so that the swelling and germination take place under their influence. If, for example, a potassium zeolite be employed, about 2 kg. in finely powdered form is mixed with about 250 liters of water to give a milk-like turbid fluid. About 100 kg. of clean barley may be steeped therein in the usual manner. A calcium zeolite may be used in the same manner. The malt in either case is of good quality and gives a greater yield of extract than ordinary. The wort from such a malt gives an advantageous fermentation. In making mash from the malt additions of zeolites may be made to the water in the same way with the result of increasing the amount of extract and favorably affecting the subsequent zymolysis by yeast. Zeolites may also be added to the yeast. Where zeolites are added in making malt, further quantities may or may not be added during mashing and fermentation. In making distilled spirits, amyl alcohol, pressed yeast, and lactic acid, in cellulose fermentation, ripening tobacco leaves, etc., appropriate inorganic nutrients are applied in a similar manner. All these actions, as well as those taking place in all conversions of organic material by the action of ferments, whether intracellular or extracellular, are caused by enzymic activity; and I use the term enzymic activity hereinafter in this sense, irrespective whether the particular action be intracellular, as by the action of "organized ferments" or extracellular by the action of "unorganized ferments" (enzyms).

What I claim is:—

1. In the manufacture of alcohol the process which comprises making a suspension of fine-powdered zeolites containing nutrient mineral matters in an aqueous liquid and adding such suspension to material wherein enzymic activity is to be produced.

2. In the manufacture of alcohol, the process which comprises producing malt in the presence of fine-powdered zeolites and moisture.

3. In the manufacture of alcohol, the process which comprises producing malt in the presence of fine-powdered zeolites and moisture and mashing such malt in the presence of such zeolites.

4. In the manufacture of alcohol, the process which comprises producing malt in the presence of fine-powdered zeolites and moisture, and mashing such malt to form wort and fermenting such wort in the presence of such zeolites.

5. In the manufacture of alcohol, the process which comprises steeping grain to form malt in the presence of water containing zeolites, mashing the malt to form wort in the presence of the zeolites originally added and fermenting the wort, still in the presence of such zeolites.

In testimony whereof I have signed my name to this specification in the presence of two subscribing witnesses.

EDUARD POHL.

Witnesses:
ERNST BLICK,
LOUIS KATZ.